(12) United States Patent
Berg et al.

(10) Patent No.: US 8,611,180 B2
(45) Date of Patent: Dec. 17, 2013

(54) OCEAN BOTTOM SEISMIC STATION

(75) Inventors: Arne Berg, Kattem (NO); Torbjørn Heglum, Jonsvannet (NO); Roar Furuhaug, Trondheim (NO); Tormod Bliksås, Kristiansand (NO)

(73) Assignee: Optoplan AS, Tiller (NO)

( * ) Notice: Subject to any disclaimer, the term of this patent is extended or adjusted under 35 U.S.C. 154(b) by 57 days.

(21) Appl. No.: 13/109,794

(22) Filed: May 17, 2011

(65) Prior Publication Data
US 2011/0222374 A1 Sep. 15, 2011

Related U.S. Application Data

(62) Division of application No. 12/578,466, filed on Oct. 13, 2009, now Pat. No. 7,969,817, which is a division of application No. 11/313,275, filed on Dec. 20, 2005, now Pat. No. 7,660,206.

(60) Provisional application No. 60/637,896, filed on Dec. 21, 2004.

(51) Int. Cl.
*G01V 1/38* (2006.01)
*G01V 1/16* (2006.01)
*G02B 6/44* (2006.01)

(52) U.S. Cl.
USPC .................. 367/15; 367/14; 367/20

(58) Field of Classification Search
USPC .................. 367/14, 15, 20
See application file for complete search history.

(56) References Cited

U.S. PATENT DOCUMENTS

| | | | |
|---|---|---|---|
| 4,241,427 A | 12/1980 | Swenson | |
| 4,336,639 A * | 6/1982 | Berglund | 29/25.35 |
| 4,708,427 A | 11/1987 | Ejiri et al. | |
| 4,942,557 A | 7/1990 | Seriff | |
| 5,335,620 A | 8/1994 | Small | |
| 5,796,676 A * | 8/1998 | Chang et al. | 367/20 |
| 6,021,091 A | 2/2000 | Gaiser | |
| 6,104,846 A | 8/2000 | Hodgson et al. | |
| 6,278,823 B1 | 8/2001 | Goldner et al. | |
| 6,381,397 B1 * | 4/2002 | Bevan et al. | 385/139 |
| 6,404,961 B1 * | 6/2002 | Bonja et al. | 385/109 |
| 6,519,395 B1 | 2/2003 | Bevan et al. | |
| 6,580,661 B1 * | 6/2003 | Marschall et al. | 367/154 |

(Continued)

FOREIGN PATENT DOCUMENTS

| | | |
|---|---|---|
| GB | 1470148 | 4/1977 |
| GB | 2395273 A | 5/2004 |

OTHER PUBLICATIONS

GB Search Report for Application No. GB0526027.8, dated May 23, 2006.

(Continued)

*Primary Examiner* — Eric Bolda
(74) *Attorney, Agent, or Firm* — Pearl Cohen Zedek Latzer Baratz LLP

(57) ABSTRACT

Methods and apparatus for cable termination and sensor integration at a sensor station within an ocean bottom seismic (OBS) cable array are disclosed. The sensor stations include a housing for various sensor components. Additionally, the sensor stations can accommodate an excess length of any data transmission members which may not be cut at the sensor station while enabling connection of one or more cut data transmission members with the sensor components. The sensor stations further manage any strength elements of the cable array.

4 Claims, 12 Drawing Sheets

(56) References Cited

U.S. PATENT DOCUMENTS

| | | |
|---|---|---|
| 6,607,050 B2 | 8/2003 | He et al. |
| 6,658,186 B1 | 12/2003 | Kristensen et al. |
| 6,786,297 B1 * | 9/2004 | Menard ................ 181/112 |
| 6,850,461 B2 | 2/2005 | Maas et al. |
| 6,896,447 B1 | 5/2005 | Taquino |
| 7,078,619 B2 * | 7/2006 | Chamberlain ............ 174/50 |
| 7,660,206 B2 | 2/2010 | Berg et al. |
| 2003/0223822 A1 | 12/2003 | Oldervoll et al. |
| 2005/0174887 A1 | 8/2005 | Nash et al. |
| 2005/0253049 A1 | 11/2005 | Westhall et al. |

OTHER PUBLICATIONS

British Search Report for Application No. GB0526027.8, dated Jan. 24, 2008.

* cited by examiner

OCEAN BOTTOM SEISMIC STATION

CROSS-REFERENCE TO RELATED APPLICATIONS

This application is a divisional of U.S. patent application Ser. No. 12/578,466, filed Oct. 13, 2009, now U.S. Pat. No. 7,969,817, which is a divisional of U.S. patent application Ser. No. 11/313,275 filed Dec. 20, 2005, now U.S. Pat. No. 7,660,206, which claims benefit of U.S. provisional patent application Ser. No. 60/637,896 filed Dec. 21, 2004. Each of the aforementioned related patent applications is herein incorporated by reference in its entirety.

BACKGROUND OF THE INVENTION

1. Field of the Invention

Embodiments of the invention generally relate to ocean bottom seismic (OBS) cables having arrays of sensor stations. More particularly, embodiments of the invention relate to multiple component sensor stations for cable termination and sensor integration within an OBS cable array.

2. Description of the Related Art

Marine seismic exploration surveys for the exploration and monitoring of hydrocarbon producing zones and reservoirs utilize seismic cables having sensor arrays, i.e., a plurality of sensor stations interconnected by sections of cable. In general, the sensor stations include optical and/or electrical sensors such as hydrophones, accelerometers and/or geophones.

The cable arrays are typically deployed on the ocean floor from large drums or spools. The spools require a large enough inner diameter to prevent damage to the sensor stations when the cable array is wrapped thereupon since the sensor stations may be larger and less flexible than the sections of cable connecting them. In order to maximize performance, the cable arrays may be buried in a predetermined pattern on the ocean floor. Regardless of the particular method used to deploy the cable array, deploying and optionally retrieving the cable array creates substantial tension and stress on the cable array. For example, deploying the cable array off the back of a ship in deep water creates substantial tension and stress on the cable array due to the weight of the cable array extending from the ship toward the ocean floor together with the movement of the ship. Therefore, the cable array must include strength elements designed to provide the primary axial load carrying capability.

In general, the design of a cable array with integrated sensor stations determines what flexibility is available in deploying, servicing and removing the cable arrays. Deploying a cable having sensors is a complex operation because the size of the sensor stations creates a longitudinally non-homogeneous cross section causing several limitations in the handling of the cable. Further, the size and weight of the sensor stations and cable sets requirements on handling equipment and limitations on possible length of each cable and on the number of sensor stations that can be integrated onto a cable length.

Cutting and splicing data transmission cables/fibers within the cable array at each of the sensor stations increases time and cost while decreasing reliability. Design of the sensor station and/or cable array can affect how many splices are required at each station. Accordingly, any designs or techniques that reduce the number of splices of the data transmission cables/fibers at each station decreases assembly time and cost while increasing reliability of the cable array.

Therefore, there exists a need for an inexpensive and improved cable array and corresponding sensor station for use in ocean bottom seismic (OBS). There exists a further need for OBS cable arrays having efficiently integrated sensor stations therein that are reliable, lightweight and low volume.

SUMMARY OF THE INVENTION

Embodiments of the invention generally relate to a sensor station capable of efficient cable termination and sensor integration within an ocean bottom seismic (OBS) cable array. The sensor stations include a housing for various sensor components. Additionally, the sensor stations can accommodate an excess length of any data transmission members which may not be cut at the sensor station while enabling connection of one or more cut data transmission members with the sensor components. The sensor stations further manage any strength elements of the cable array.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally relate to a sensor station disposed in an ocean bottom seismic (OBS) cable array. Obtaining an OBS survey requires placing the cable array along the ocean floor, generating seismic waves that travel downward through the earth and reflect off underground deposits or changes in formation, and recording the reflected seismic waves detected by the sensor stations. When the components of the sensor station are all optical as described herein for some embodiments, the cable includes an optical waveguide for transmission of optical signals to and from the optical components. However, the sensor station may alternatively include any combination of hydrophones, accelerometers and/or geophones, which may be electrical components connected to an electrically conductive cable for transmission of data from the electrical components and/or optical components.

Since strength elements in the cable arrays make the cable array stiff, the high rigidity of the cable array allows noise transmitted into one part of the cable array to migrate throughout the cable array to the sensor stations along the cable array. According to some aspects of the invention, the sensor stations can remain seismically decoupled from the sections of cable during seismic surveying in order to reduce noise. However, the entire cable array must have sufficient strength during deployment to accommodate the tension and stress thereon until the tension reduces when the cable array is positioned on the ocean floor. Even if the cable is seismically decoupled from the sensor station itself, the cable proximate the sensor station can make the ground around the station move such that it may also be required to seismically decouple the cable proximate the sensor station in order to further reduce noise transmitted across the cable.

Figure 1:
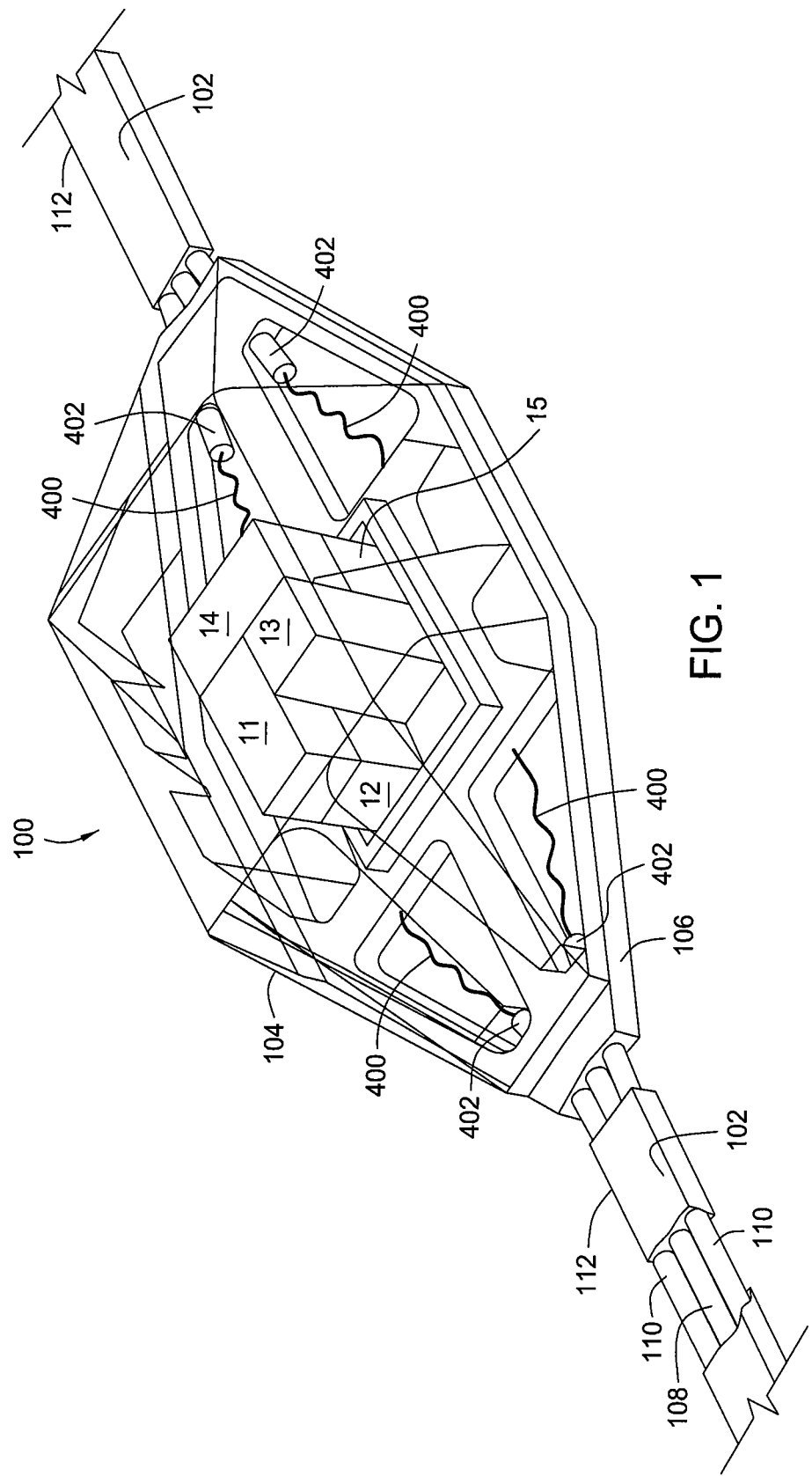
FIG. 1 is a perspective view of a sensor station disposed along a cable with a top cover of the sensor station shown transparent.

FIG. 1 shows a sensor station 100 disposed along a cable 102. In practice, the entire length of the cable 102 includes an array formed by a plurality of the sensors stations 100 spaced apart along the cable 102. The sensor station 100 includes a housing or top cover 104 (shown transparent) disposed on top of a base plate 106 that supports, in one embodiment, one optical hydrophone 11 and three orthogonally oriented optical accelerometers 12, 13, 14 beneath the top cover 104. The cable 102 can include an optical waveguide member 108, at least one strength element that is shown as two strength elements 110 on each side of the optical waveguide member 108 and an outer covering 112 surrounding the optical waveguide member 108 and the strength elements 110.

Figure 2:
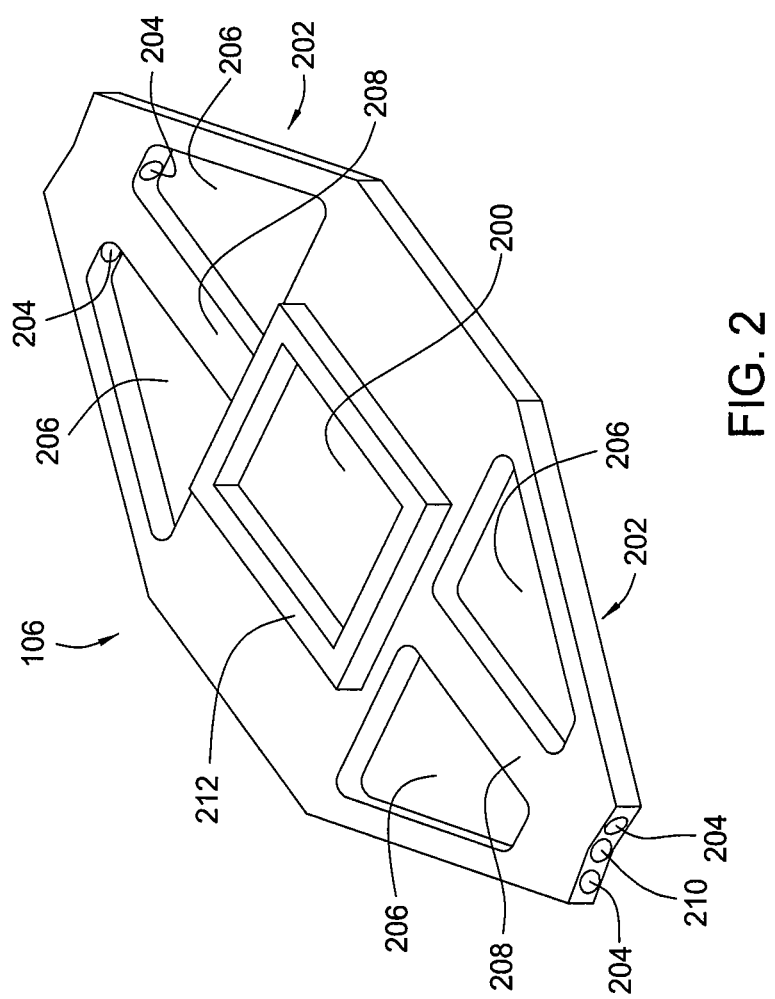
FIG. 2 is a perspective view of a base plate of the sensor station shown in FIG. 1.

FIG. 2 illustrates the base plate 106 of the sensor station 100. The base plate 106 may be made by cost effective molding and includes a center portion 200 and flexible tapered end portions 202 on opposite sides of the center portion 200. As in one alternative embodiment shown in FIG. 1, the strength elements 110 of the cable 102 may terminate at each end of the sensor station 100 and mechanically couple to the base plate 106. Specifically, the terminated strength elements 110 mechanically couple to the flexible tapered end portions 202 of the base plate 106. The terminated strength elements 110 may couple to the base plate 106 by appropriate fixing (e.g., welding or clamping) of the ends of the terminated strength elements 110 after the ends have been inserted into end apertures 204 extending through the end of the tapered end portions 202. Thus, the base plate 106 must withstand the required strain during deployment since the strength elements 110 of the cable 102 mechanically couple at each end of the base plate 106.

Voids 206 through the tapered end portions 202 increase flexibility of the base plate 106 at the tapered end portions 202. For some embodiments, the top cover 104 may not fix to the tapered end portions 202 in order to not affect the flexibility of the tapered end portions 202. This flexibility of the tapered end portions 202 where the strength elements 110 of the cable 102 couple to the sensor station 100 aids in both the ability of the sensor station 100 to be wound onto a spool and the seismic decoupling of the sensor station 100 from the cable 102 since the strength elements 110 are the most stiff portion of the cable 102.

Central flexible guides 208 extend from the center portion 200 of the base plate 106 to the ends of the base plate 106 where the cable 102 couples thereto. The guides 208 provide a protected passage 210 to and from the center portion 200 for the optical waveguide member 108 of the cable 102. The center portion 200 provides a generally stiffer area than the tapered end members 202 and provides an area within a profile 212 where the hydrophone 11 and accelerometers 12, 13, 14 are located after being coupled to the optical waveguide member 108 of the cable 102. Typically, coupling the optical waveguide member 108 to the hydrophone 11 and accelerometers 12, 13, 14 includes terminating and splicing optical fibers of the optical waveguide member 108 to the hydrophone 11 and accelerometers 12, 13, 14. An additional element 15 may be included for packaging of any possible required fiber optic components such as couplers used to connect the hydrophone 11 and accelerometers 12, 13, 14 to each other and/or the waveguide member 108.

Figure 3:
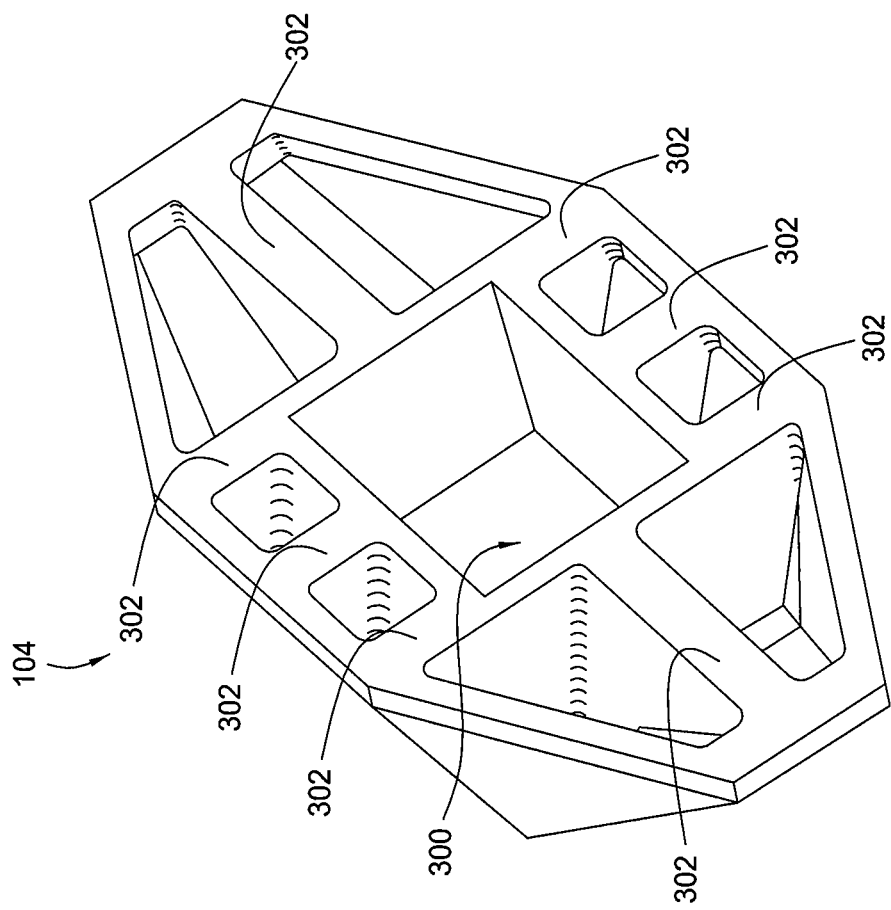
FIG. 3 is a perspective view of an underside of the top cover of the sensor station shown in FIG. 1.

FIG. 3 shows the underside of the top cover 104 of the sensor station 100. The top cover 104 may be made by cost effective molding and includes a center sensor cavity 300 and ribs 302 between the sensor cavity 300 and the outer walls of the top cover 104. Preferably, the top cover 104 and/or the base plate are molded from composites. The ribs 302 of the top cover 104 make the top cover 104 very rugged to prevent damage to the hydrophone 11 and accelerometers 12, 13, 14 during deployment and permit the sensor station 100 to withstand burying.

The shape of the top cover 104 corresponds to the shape of the base plate 106. Further, the sensor cavity 300 of the top cover 104 mates with the profile 212 in order to seal the sensor cavity 300 once the hydrophone 11 and accelerometers 12, 13, 14 are in place and coupled to the optical waveguide member 108. Once sealed, the sensor cavity 300 may be filled with a protective oil to make a pressure balanced cavity that eliminates the need for high rated pressure barriers. The oil also ensures a good acoustic coupling for the hydrophone 11 with the under water pressure changes.

Figure 4:
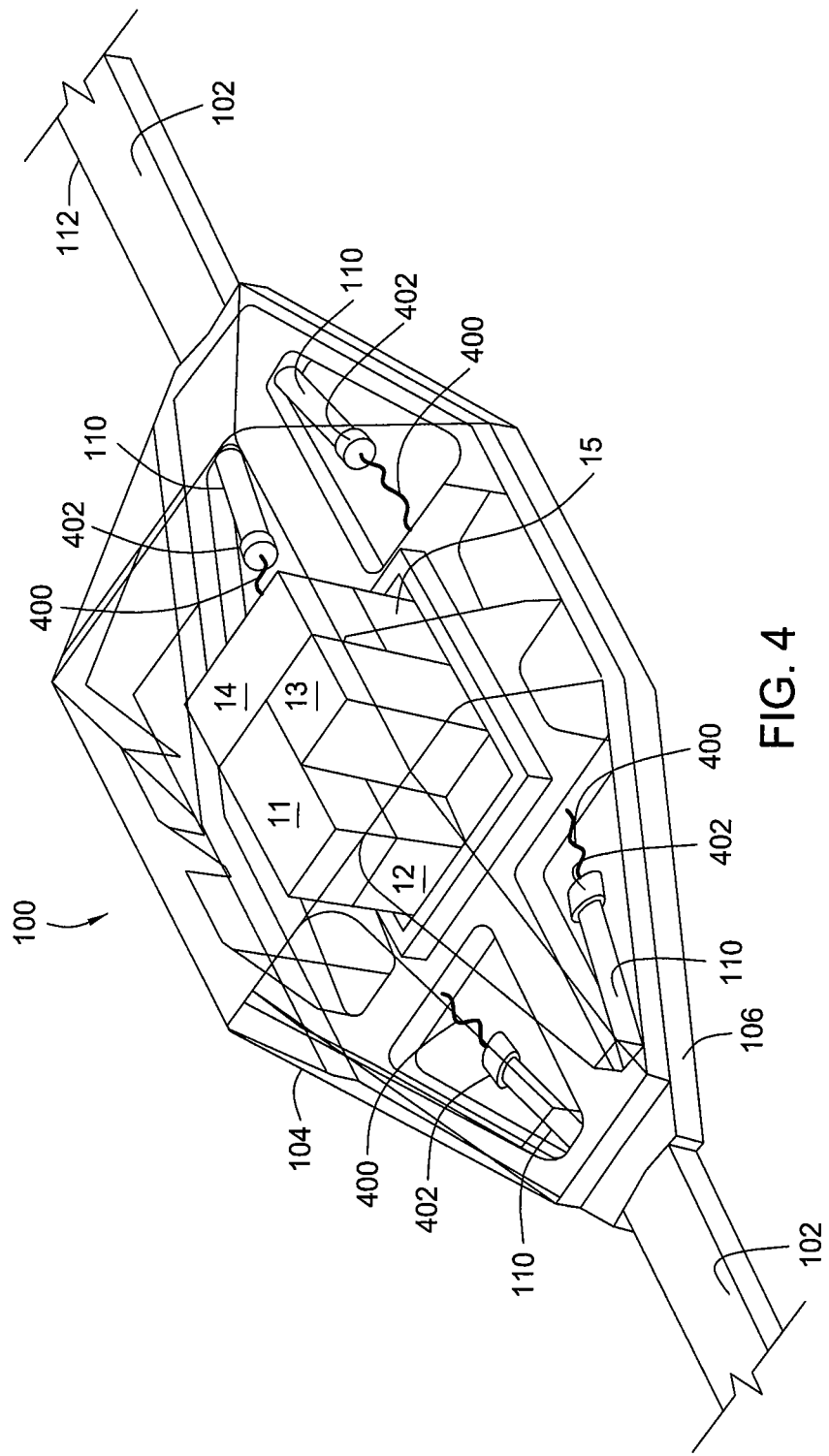
FIG. 4 is a perspective view of the sensor station with a biasing member retracted to decouple the sensor station from the cable once tension is reduced.

FIG. 4 illustrates the sensor station 100 with a biasing member 400 retracted to further decouple the sensor station 100 from the cable 102 once tension is reduced (e.g., after deployment). In the embodiment shown, the strength elements 110 connect with the biasing member 400 via a connector 402 that has a larger diameter than the end apertures 204 of the base plate 106. Thus, interference between the end apertures 204 and the connector 402 provides an end stop with high strength to take the load during deployment as shown in FIG. 1. However, the tension reduces when the sensor station 100 is positioned on the sea floor such that the biasing member 400 attached to an opposite end of the tapered end portions 202 pulls the connector 402 away from the end apertures 204 as illustrated in FIG. 4, thereby reducing the seismic coupling between the cable 102 and the sensor station 100. The biasing member 400 may be a spring, an elastomer or any other type of elastic element. In general, any coupling assembly that couples the strength elements 110 of the cable 102 to the sensor station 100 that utilizes a biasing member with an end stop to selectively transfer tension during deployment may be used to further decouple the sensor station 100 from the cable 102.

Figure 5:
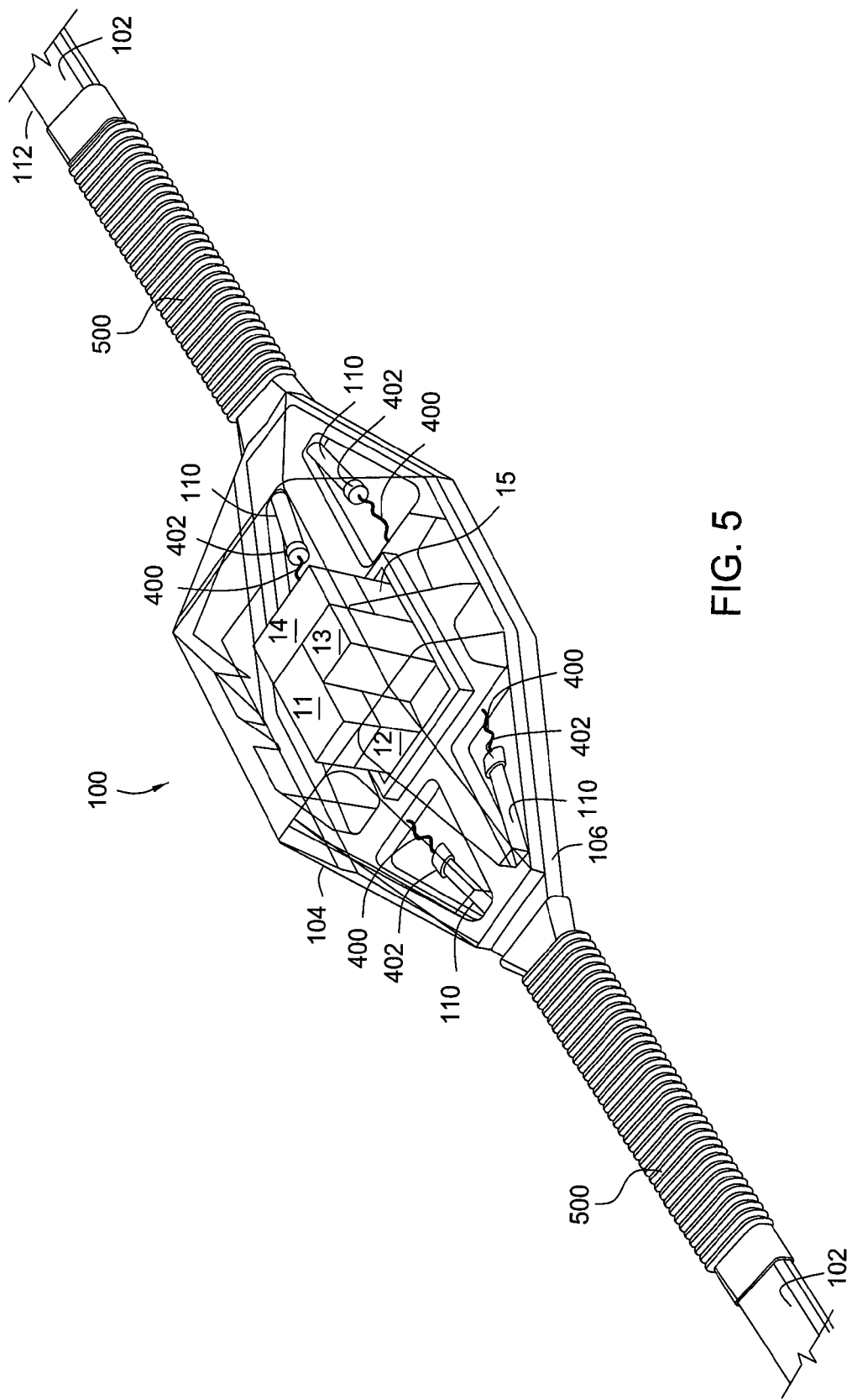
FIG. 5 is a perspective view of the sensor station with cable noise reducing hoses surrounding the cable proximate the sensor station.

FIG. 5 shows the sensor station with two cable noise reducing hoses 500 surrounding the cable 102 proximate the sensor station 100. Each of the hoses 500 mount to opposite ends of the base plate 106 and may extend between approximately 0.5 and approximately 2.0 meters from the sensor station 100. The hoses 500 aid in seismically decoupling the cable 102 from the ground close to the sensor station 100 once the sensor station is deployed. In this regard, the hoses 500 around the cable 102 reduce friction between the cable 102 and the ground along the length of the hoses 500. The cable 102 fits loosely within the hoses 500 without being directly secured to the hoses 500 in order to permit movement therein. An inside of the hoses 500 provide a friction coefficient sufficiently low to not inhibit movement of the cable 102 within the hoses 500. Accordingly, the inside surface of the hoses 500 may be coated with a Teflon layer. The hoses 500 may be a corrugated plastic with a metal spiral spring inside to enable flexibility while withstanding radial compression when buried into the ground.

Figure 6:
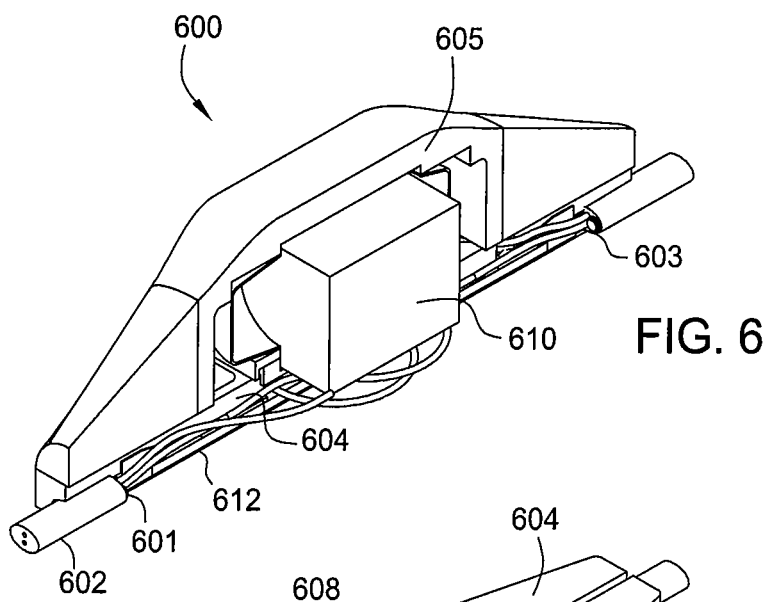
FIG. 6 is a perspective partial cut away view of a sensor station disposed along a cable.
Figure 7:
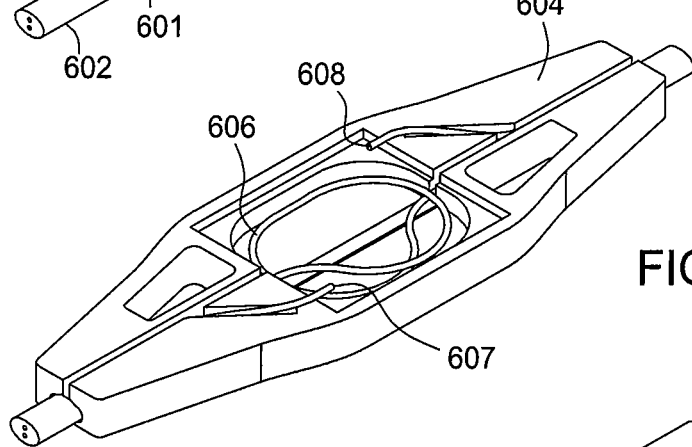
FIG. 7 is a perspective view of a base plate of the sensor station shown in FIG. 6.

FIG. 6 illustrates a partial cut away view of a seismic sensor station 600 disposed along a seismic composite cable 602. The station 600 includes a base plate 604 for cable termination and protection of an excess length of a first optical cable 606 of the composite cable 602, as shown in FIG. 7. The first optical cable 606 bypasses the station 600 and is not cut in two at the station 600 such that the excess length is coiled into a recessed central portion of the base plate 604. A second optical cable of the composite cable 602 is cut to provide first and second termini 607, 608 that enable splicing with optical components 610 of the sensor station 600. The optical components 610 mount onto the base plate 604 above the recessed portion holding the first optical cable 606. A housing 605 mounts onto the base plate 604 to enclose the optical components 610.

The first optical cable 606 may not be cut at the station 600 to reduce losses of signals from the stations along the cable 602, to decrease cost and to improve reliability. For example, one or multiple fibers within the first optical cable 606 (e.g., fiber(s) in metal tube) may proceed to other stations along the cable 602. At any of these other stations, one or more of these fibers that were not cut in the first optical cable 606 can be cut to provide termini for splicing to optical components. Accordingly, the stations can be multiplexed with a desired number of the stations per optical fiber without unnecessary cutting and splicing of the fibers/cables.

Figure 8:
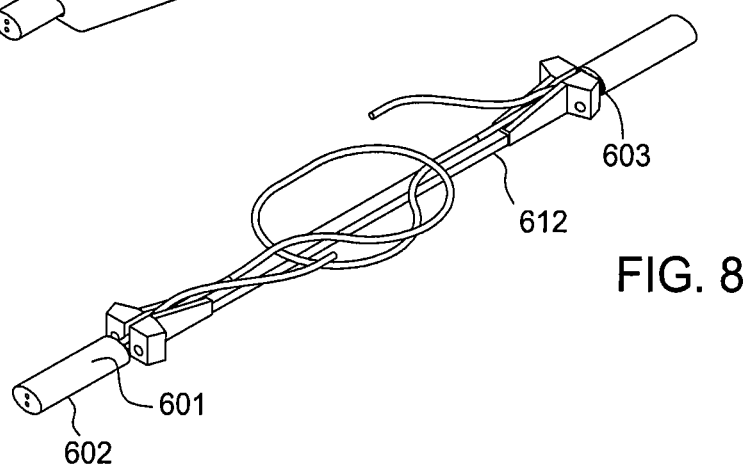
FIG. 8 is a perspective view of the cable coupled to a strength member of the sensor station shown in FIG. 6.

The base plate 604 can include a strength member 612 shown in FIG. 8 to transfer load between first and second regions 601, 603 of the cable 602. For example, cut ends of strength elements (not shown) within the composite cable 602 can couple to the strength member 612 in a manner similar to other couplings of cable strength elements described herein. The strength member 612 can be formed of metal and disposed within a longitudinal recess of the base plate 604.

Figure 9:
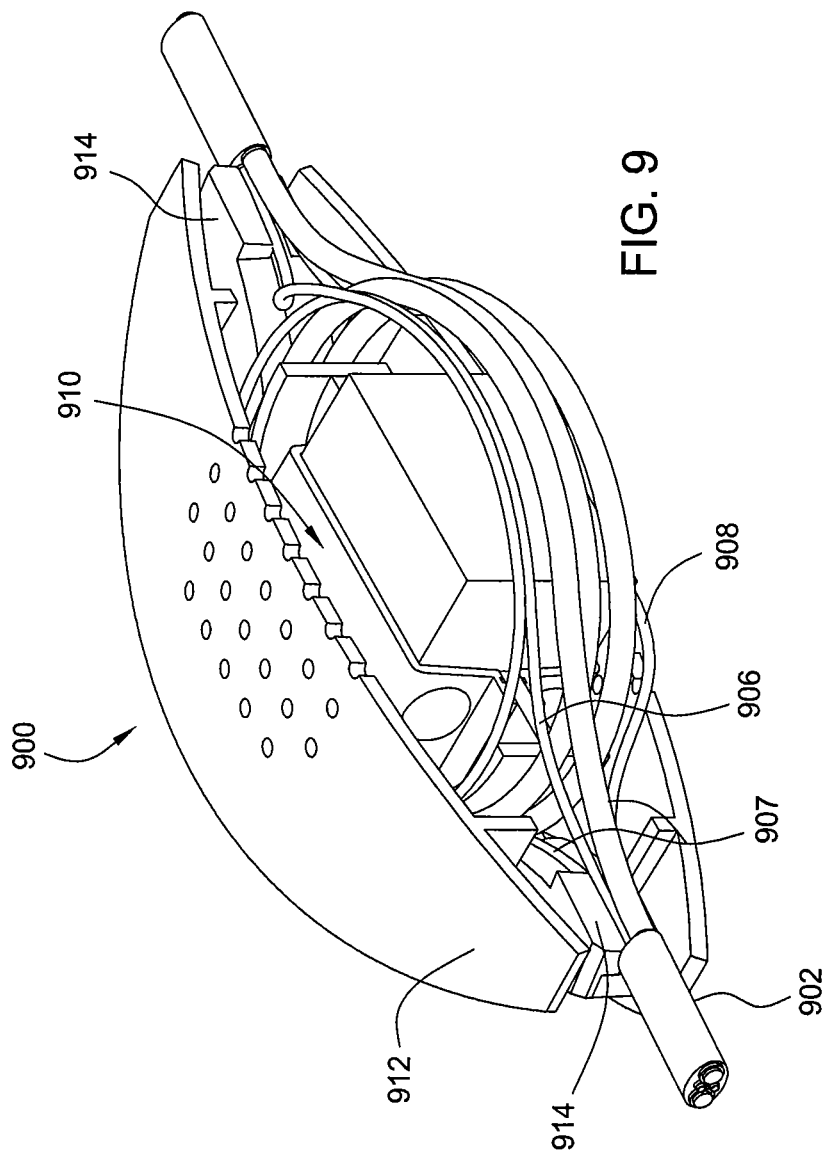
FIG. 9 is a perspective partial cut away view of a sensor station disposed along a cable without severing strength elements of the cable.

FIG. 9 illustrates a seismic sensor station 900 disposed along a composite cable 902 having strength elements 907 as well as first and second optical cables 906, 908. The first optical cable 906 can include multiple fibers within a metal tube and bypasses the sensor station 900 without being terminated. For example, the first optical cable 906 can be arranged on an outside surface of an internal sensor housing 910 so as to continue in a continuous manner to the next station along the composite cable 902. The second optical cable 908 can include a single optical fiber within a metal tube and can be terminated inside the sensor station 900 to connect thereto.

An external shroud 912 defines a space between the outside surface of the internal sensor housing 910 and an inside surface of the external shroud 912 for allowing a length of the first optical cable 906 to be loosely arranged at least partly within the space while also mechanically protecting the second optical cable 908 from the external environment. The outside surface of the internal sensor housing 910 can represent a generally circular or elliptical shape for coiling the first optical cable 906 around.

Additionally, the strength elements 907 of the composite cable 902 can be coiled up without cutting similar to the first optical cable 906. The strength elements 907 can lock onto the internal sensor housing 910 by tensioning the cable 902. The internal sensor housing 910 takes load through a squeezing effect when the cable 902 is pulled at full load. Guide members 914 guide the strength elements 907 at ends of the sensor station 900 to control a path of the strength elements and forces during bending at tension.

Figure 10:
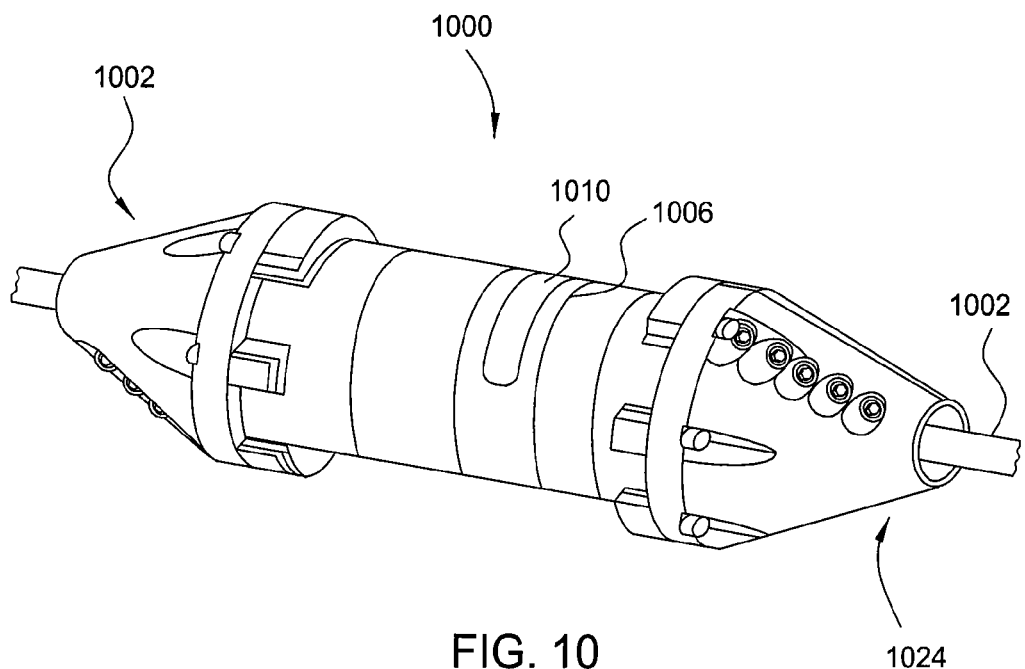
FIG. 10 is a perspective view of a sensor station disposed along a cable.

FIG. 10 illustrates a seismic sensor station 1000 that has a circular and symmetric design and is disposed along a composite cable 1002. A cylindrical shaped internal housing 1010 provides an outside surface where a first optical cable 1006 of the composite cable 1003 is coiled. Since the first optical cable 1006 is not cut, the first optical cable 1006 defines a loop that wraps onto the internal housing 1010 from both ends of the internal housing 1010 towards a central region of the internal housing 1010 where a midpoint of the loop is disposed. Cable coupling members 1024 are fastened to each end of the housing 1010.

Figure 11:
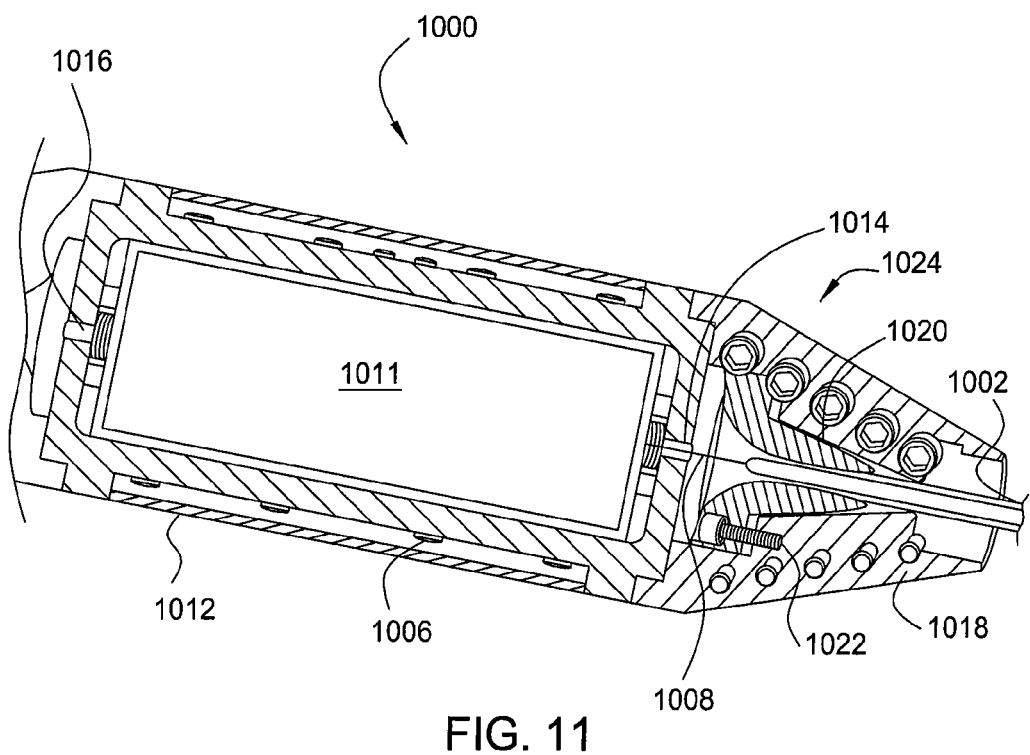
FIG. 11 is a cross section view of the sensor station shown in FIG. 10.

FIG. 11 shows a section view of the sensor station 1000. The sensor station 1000 includes sensor components 1011 disposed inside the housing 1010 and an external shroud 1012 (not shown in FIG. 10) surrounding a region of the housing 1010 where the first optical cable 1006 has been routed to and coiled around. First and second passages 1014, 1016 through the housing 1010 enable routing of a second optical cable into and out of the housing 1010 for connection to the sensor components 1011.

Each of the cable coupling members 1024 includes a split body 1018 fastened together to define an internal conical bore for mating engagement with a conical member 1020. The conical member 1020 is tightened down around a strength section of the cable 1002 via bolts 1022 threaded into the body 1018. The first and second optical cables 1006, 1008 extend through the conical wedge 1020 from within a concentric central region of the cable 1002 that is gripped by the conical wedge 1020. For some embodiments, the first optical cable 1006 can be disposed within the concentric central region while the second optical cable 1008 can replace one or more armor wires/cables of the strength section of the cable 1002.

Figure 12:
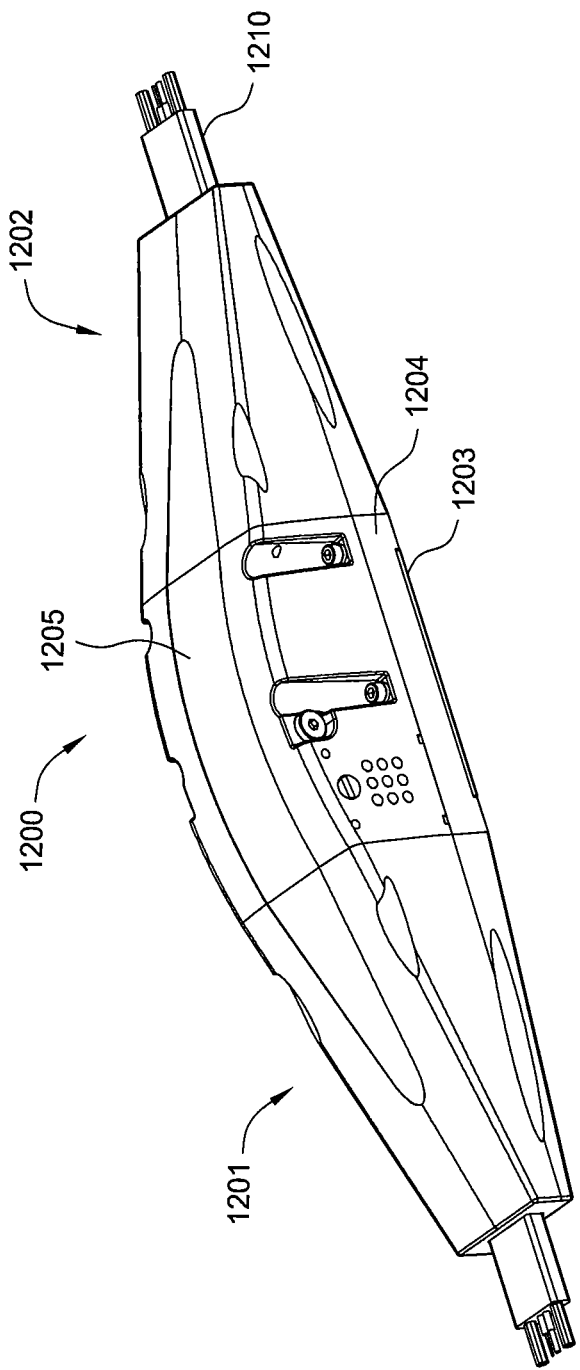
FIG. 12 is a perspective view of a sensor station disposed along a cable with bend limiters disposed around the cable on each side of the sensor station.

FIG. 12 illustrates a seismic sensor station 1200 disposed between first and second bend limiters 1201, 1202 disposed along a composite cable 1210. The bend limiters 1201, 1202 along with the cable 1210 provide flexibility extending from the station 1200. Additionally, each of the bend limiters 1201, 1202 can be made of rubber and can prevent kinks of the cable 1210 that loosely passes through a channel through the bend limiter.

The sensor station 1200 includes a base member 1204 that a top cover 1205 is secured to. The bend limiters 1201, 1202 can fix to the top cover 1205 and/or base member 1204 by bolts or other fasteners. Similar to other embodiments described heretofore, an interior volume defined by the base member 1204 and top cover 1205 houses sensor components (not shown). The base member 1204 is structurally rigid and can be made of metal such as steel to accept loads across the cable 1210 at the station 1200.

Figure 13:
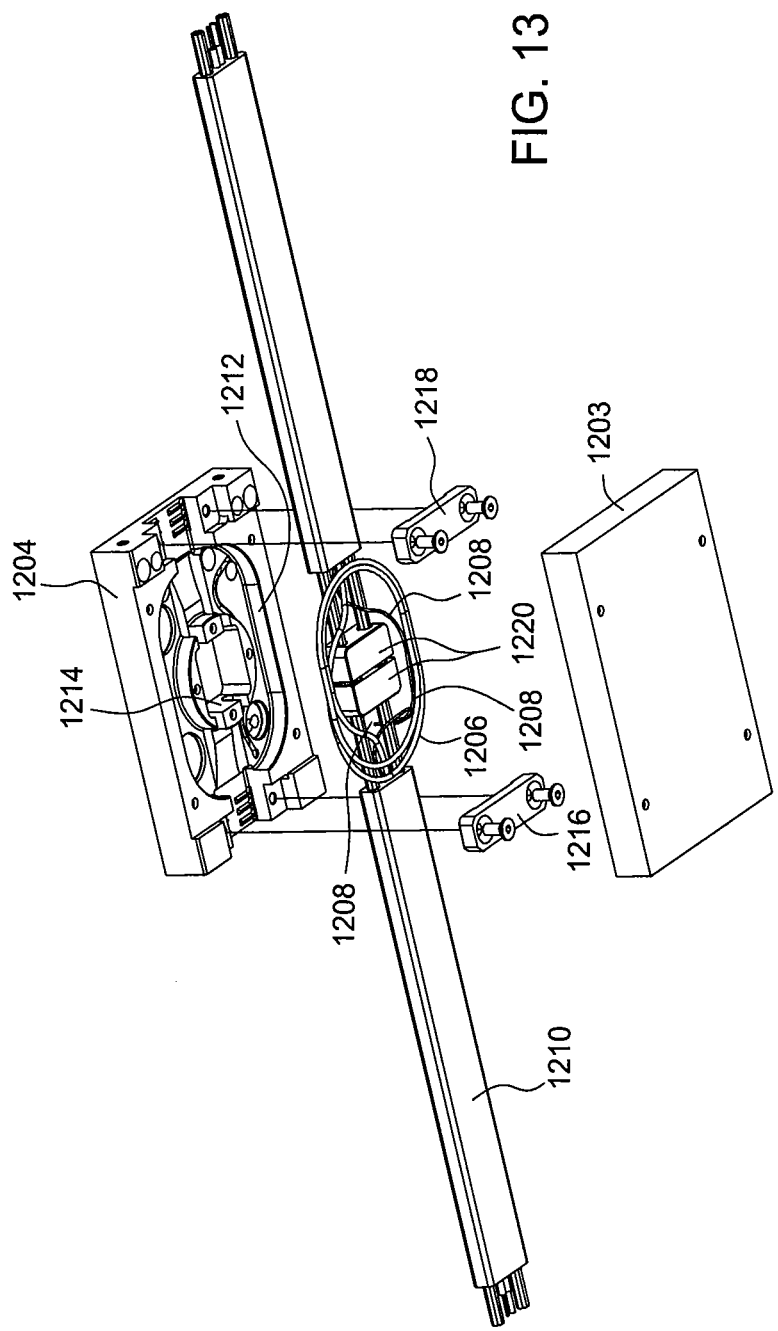
FIG. 13 is an exploded view of a base plate of the sensor station shown in FIG. 12 holding the cable.

FIG. 13 shows an exploded view of a bottom side of the base plate 1204 adapted for holding the cable 1210. The base plate includes a recessed region 1212 for holding a coil of excess length of a first optical cable 1206 of the composite cable 1210. Additionally, the base plate 1204 defines a cavity 1214 configured to secure each connector member 1220 coupled to the cable 1210. First and second clips 1216, 1218 fasten into the base member 1204 over the cable 1210 to aid in holding the cable 1210 properly within the base member 1204.

Figure 14:
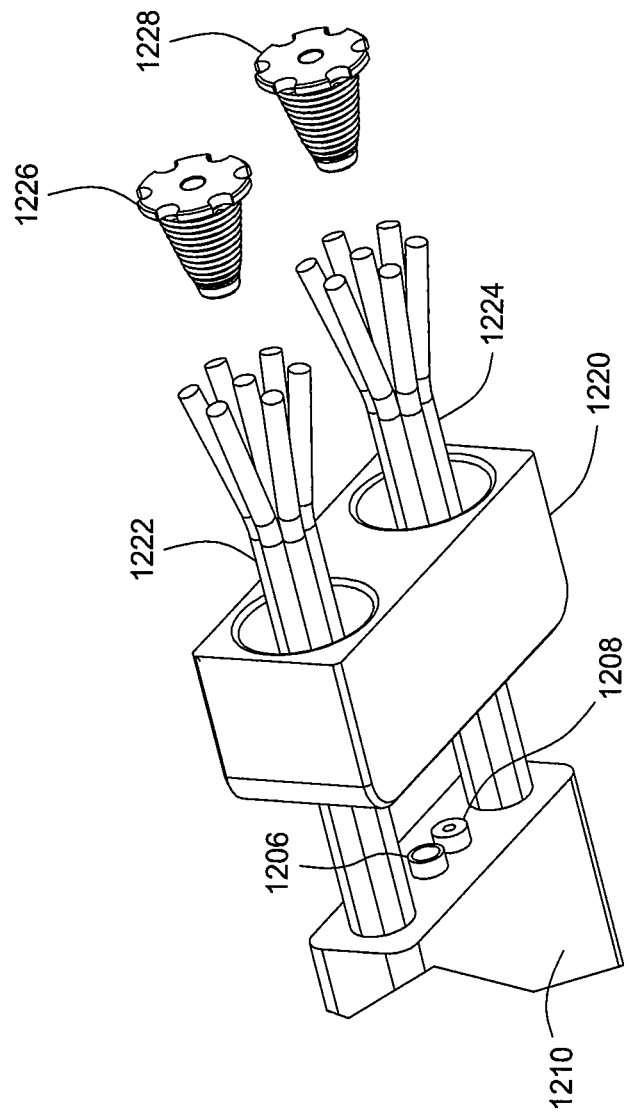
FIG. 14 is an exploded view of a connector within the sensor station shown in FIG. 12 for coupling to strength elements of the cable.

FIG. 14 illustrates an exploded view of the connector member 1220 for coupling to first and second strength elements 1222, 1224 of the composite cable 1210. Stripped portions of the strength elements 1222, 1224 pass through respective conical bores in the connector member 1220. First and second conical inserts 1226, 1228 are disposed centrally between strands of, respectively, the first and second strength elements 1222, 1224. Each of the conical inserts 1226, 1228 has a corrugated conical surface that engages the corresponding strength elements 1222, 1224 for self locking of the strength elements 1222, 1224 within the connector member 1220 when tension is applied to the cable 1210. Squeezing of the strength elements 1222, 1224 between the connector member 1220 and the conical inserts 1226, 1228 that cannot pass through the bores in the connector member 1220 affixes the connector member 1220 with respect to the strength elements 1222, 1224.

With reference to FIGS. 12-14, assembly of the sensor station 1200 includes stripping an area of the composite cable 1210, cutting the strength elements 1222, 1224, preparing the connector members 1220, and cutting a second optical cable 1208 in a central region of the area of the composite cable 1210 that is stripped. The optical cables 1206, 1208 can each be fiber(s) in a metal tube (FIMT). Assembly progresses by positioning ends of the second optical cable 1208 through apertures in the base member 1204 and bonding and sealing of the second optical cable 1208 within the apertures. Locking down the clips 1216, 1218 holds the cable 1210 to the base member 1204 with the connector members 1220 in the cavity 1214 to prevent movement relative to the base member 1204. Coiling of the first optical cable 1206 for placement into the recessed region 1212 occurs without cutting the first optical cable 1206 or otherwise altering the (FIMT) such that the first optical cable 1206 resists undesirable bending. Placing a bottom cover 1203 over the recessed region 1212 protects the optical cables 1206, 1208 and further maintains the connector members 1220 within the cavity 1214.

Splicing the second optical cable 1208 with the optical components disposed on top of the base member 1204 can occur since the second optical cable 1208 is cut with ends extending through the base member 1204. Securing the top cover 1204 to the base member 1205 encloses the optical components. Fixing the bend limiters 1201, 1202 to the top cover 1205 and base member 1204 completes the assembly of the sensor station 1200. For some embodiments, the bend limiters 1201, 1202 are not split such that it may be necessary to feed the appropriate bend limiters 1201, 1202 onto the cable 1210 prior to assembling the station 1200.

A first interior volume between the top cover 1205 and the base member 1204 can be sealed while a second interior volume between the bottom cover 1203 and the base member 1204 may not be sealed. For some embodiments, the top cover 1205 may be ported to communicate pressure to at least an area of the first interior volume where a hydrophone of the optical components is located. Portions of the optical cables 1206, 1208 within the second interior volume can be maintained as the FIMT since the first optical cable 1206 is uncut and the second optical cable 1208 can enter the first interior volume as the FIMT.

Figure 15:
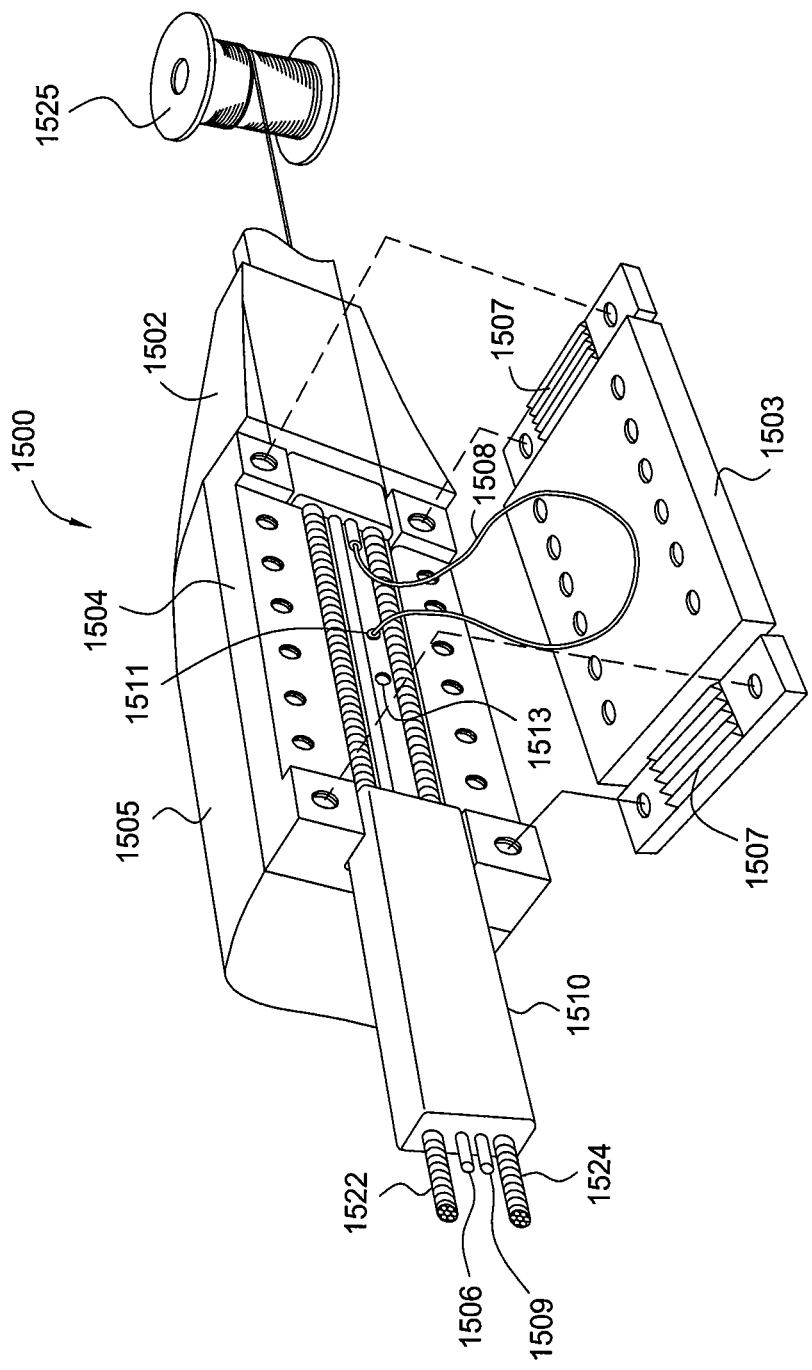
FIG. 15 is a perspective view of a sensor station during a fabrication procedure that provides an excess length of only one element within a multi-element cable at each station to enable splicing with the one element.

FIG. 15 shows a sensor station 1500 during a fabrication procedure that provides an excess length of a second optical cable 1508 within a multi-element cable 1510 at each station to enable splicing of the second optical cable 1508 with sensor components (not shown). For some embodiments, the multi-element cable includes strength elements 1522, 1524, a hollow passage tube 1509 and a first optical cable 1506 such as a multi-fiber FIMT. As previously discussed, the first optical cable 1506 can contain a plurality of waveguides or fibers that pass through the sensor stations. At desired locations, one or more waveguides or fibers within the second optical cable 1508 can crossover with or pick-up one or more of the waveguides in the first optical cable 1506 to enable splicing into different transmission paths.

Similar to the sensor station 1200 shown in FIG. 12, the sensor station 1500 can be disposed between bend limiters 1502 (only one is shown). Additionally, the sensor station 1500 includes an interior volume defined by a base member 1504 and a top cover 1505 that houses the sensor components. Assembly of the sensor station 1500 includes stripping an area of the multi-element cable 1510 to expose at least the passage tube 1509 and cutting the passage tube 1509 without cutting the strength elements 1522, 1524 or the first optical cable 1506. The strength elements 1522, 1524 and the first optical cable 1506 pass straight through the station 1500. Assembly progresses by pulling the second optical cable 1508 through the passage tube 1509. For some embodiments, the passage tube 1509 can include a metal wire used to pull the second optical cable 1508 off a drum 1525 and through the passage tube 1509. This procedure of feeding the second optical cable 1508 through the passage tube 1509 progresses between each station in order to continue to subsequent stations along the multi-element cable 1510. A desired length of the second optical cable 1508 can be pulled out or remain left out of the passage tube 1509 to accomplish station splicing. The second optical cable 1508 can be coated with a polymer material to prevent corrosion inside the passage tube 1509.

One end of the second optical cable 1508 pulled from the passage tube 1509 at the station 1500 is disposed through an entrance aperture 1511 in the base member 1504 and can be bonded and sealed within the entrance aperture 1511. As the fabrication procedure progresses to the subsequent stations, another end of the second optical cable 1508 remaining out at the station 1500 is disposed through an exit aperture 1513 in the base member 1504 and can be bonded and sealed within the exit aperture 1513. Splicing the second optical cable 1508 with the optical components disposed on top of the base member 1504 can occur since the second optical cable 1508 has these ends with sufficient excess length extending through the base member 1504.

The station 1500 clamps to the multi-element cable 1510. Securing a bottom cover 1503 to the base member 1504 can fix the station 1500 at a position along the multi-element cable 1510 by sandwiching the multi-element cable 1510 between the bottom cover 1503 and the base member 1504. For some embodiments, gripping teeth 1507 disposed on each end of the bottom cover 1503 facilitate clamping of the multi-element cable 1510.

A method of integrating a sensor station in an ocean bottom seismic cable array includes providing a cable of the ocean bottom seismic cable array having one or more strength elements and a data transmission member and coupling a base plate of a sensor station to a terminated end of the strength elements, wherein the base plate is substantially seismically decoupled from the cable at tensions between the base plate and cable below a predetermined value.

Features and aspects of any of the embodiments described herein can be combined or otherwise modified with any features or aspects of other embodiments described herein. While the foregoing is directed to embodiments of the present invention, other and further embodiments of the invention may be devised without departing from the basic scope thereof, and the scope thereof is determined by the claims that follow.

What is claimed is:

1. A seismic sensor station for disposal on a seismic cable, the seismic cable comprising an uncut first optical cable, a second optical cable and a cut strength member, the sensor station comprising:

a base member configured to restrain on a first side of the base member complementary coupling members fixed to each cut end of the strength member; the seismic cable having a first length segment proximal to a first of the cut ends of the cut strength member and a second length segment proximal to a second of the cut ends of the cut strength member, a first cover coupled to the first side of the base member to define a first interior volume between the first cover and the base member, the first interior volume being in communication with an end of the first length segment and an end of the second length segment, the first interior volume in this way being configured for guiding the uncut first optical cable between the first and second length segments of the seismic cable, the first interior volume further being configured for storing an excess length of the first optical cable; and a second cover coupled to a second side of the base member opposite from the first side to define a second interior volume between the second cover and the base member adapted for housing sensor components, wherein an aperture through the base member enables sealed passage between the first and second interior volumes of a second optical cable of the seismic cable for connection of the second optical cable to the sensor components.

2. The seismic sensor station of claim 1, wherein a fiber in metal tube of the second optical cable is sealed within the aperture.

3. The seismic sensor station of claim 1, wherein the complementary coupling members are disposed in a cavity within the base.

4. The seismic sensor station of claim 1, wherein the complementary coupling members are disposed in a cavity within the base and retained within the cavity by the first cover.

* * * * *